(12) United States Patent
Sugiyama et al.

(10) Patent No.: US 9,905,247 B2
(45) Date of Patent: Feb. 27, 2018

(54) SIGNAL PROCESSING APPARATUS, MEDIUM APPARATUS, SIGNAL PROCESSING METHOD, AND SIGNAL PROCESSING PROGRAM

(71) Applicant: NEC Corporation, Minato-ku, Tokyo (JP)

(72) Inventors: Akihiko Sugiyama, Tokyo (JP); Ryoji Miyahara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/026,679

(22) PCT Filed: Aug. 7, 2014

(86) PCT No.: PCT/JP2014/070807
§ 371 (c)(1),
(2) Date: Apr. 1, 2016

(87) PCT Pub. No.: WO2015/049921
PCT Pub. Date: Apr. 9, 2015

(65) Prior Publication Data
US 2016/0254008 A1    Sep. 1, 2016

(30) Foreign Application Priority Data

Oct. 4, 2013  (JP) ................................. 2013-209731

(51) Int. Cl.
*H04R 1/40*    (2006.01)
*H04R 3/00*    (2006.01)
*G10L 21/0388* (2013.01)
*H04N 1/42*    (2006.01)

(52) U.S. Cl.
CPC ........... *G10L 21/0388* (2013.01); *H04N 1/42* (2013.01); *H04R 3/005* (2013.01); *H04R 1/406* (2013.01);

(Continued)

(58) Field of Classification Search
CPC ...... H04N 1/42; G10L 21/0308; H04R 3/005; H04R 2410/05; H04R 2430/23
See application file for complete search history.

(56) References Cited

U.S. PATENT DOCUMENTS

2002/0193130 A1* 12/2002 Yang ...................... H04R 3/005
                                                    455/501
2003/0040908 A1*  2/2003 Yang ...................... H04R 3/005
                                                    704/233

(Continued)

FOREIGN PATENT DOCUMENTS

JP  H111-018194 A  1/1999
JP  2003-223198 A  8/2003

(Continued)

OTHER PUBLICATIONS

Griffiths et al., "An Alternative Approach to Linearly Constrained Adaptive Beamforming", IEEE Transactions on Antennas and Propagations, vol. 30, No. 1, pp. 27-34, Jan. 1982 English Abstract Cited in the Specification.

(Continued)

*Primary Examiner* — Sonia Gay

(57) ABSTRACT

There is proposed a signal processing apparatus for enhancing a target signal and suppressing the remaining components without increasing an array size or the number of sensors. This signal processing apparatus includes a first array processor that generates a first array processing signal by enhancing a predetermined signal among signals received from a plurality of sensors, and a decorrelator that generates a decorrelated signal by removing, from the first array processing signal, a signal component correlated with a signal received from an auxiliary sensor different from the plurality of sensors.

5 Claims, 17 Drawing Sheets

(52) U.S. Cl.
CPC ...... *H04R 2410/05* (2013.01); *H04R 2430/23* (2013.01)

(56) References Cited

U.S. PATENT DOCUMENTS

2011/0286609 A1 11/2011 Faller
2013/0332156 A1* 12/2013 Tackin ................ H04M 1/6041
704/226

FOREIGN PATENT DOCUMENTS

| JP | 2004-289762 A | 10/2004 |
|---|---|---|
| JP | 2007-093630 A | 4/2007 |
| JP | 2012-517613 A | 8/2012 |

OTHER PUBLICATIONS

Brandstein et al., "Microphone Arrays-Signal Processing Techniques and Applications", Springer, 2001 English Abstract Cited in the Specification.

Flanagan et al., "Computer-steered microphone arrays for sound transduction in large rooms", Journal of Acoustical Society of America, vol. 78, No. 5, pp. 1508-1818, May 1985 English Abstract Cited in the Specification.

Chou, "Frequency-Independent Beamformer with Low Response Error", IEEE Proceedings of International Conference on Acoustics, Speech, and Signal Processing, vol. V, pp. 2995-2998, May 1995 English Abstract Cited in the Specification.

Benesty et al."Springer of Speech Processing", Ch. 465, Handbook of Speech Processing, Springer, 2008 English Abstract Cited in the Specification.

Goodwin et al.,"Adaptive Filtering Prediction and Control", Sec. 8, Prentice-Hall, Englewood Cliffs, NJ, 1984 English Abstract Cited in the Specification.

Shynk,"Frequency-Domain and Multirate Adaptive Filtering", IEEE Transactions on Acoustics, Speech, and Signal Processing, vol. 9, No. 1, pp. 14-37, Jan. 1992 English Abstract Cited in the Specification.

IEEE Signal Processing Magazine, vol. 31, No. 3, pp. 609-615, Jun. 1983 English Abstract Cited in the Specification.

International Search Report for PCT Application No. PCT/JP2014/070807, dated Nov. 4, 2014.

* cited by examiner

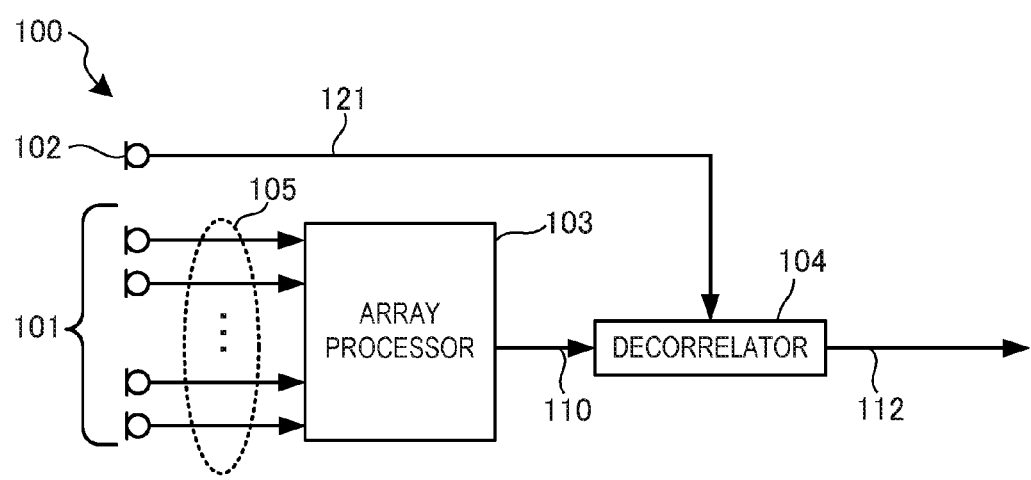
F I G. 1

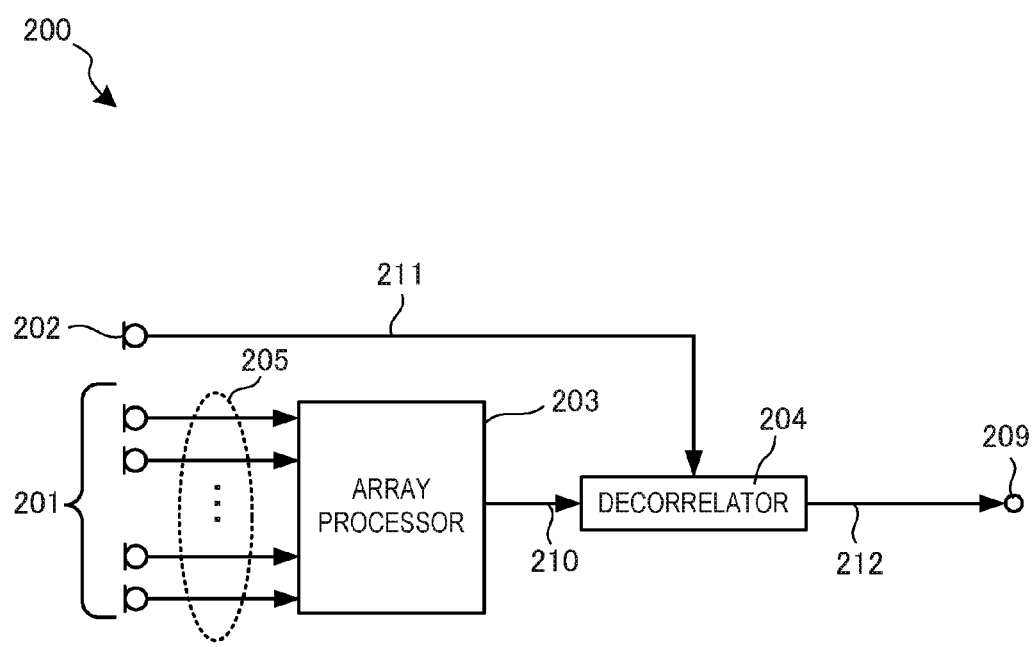
F I G. 2A

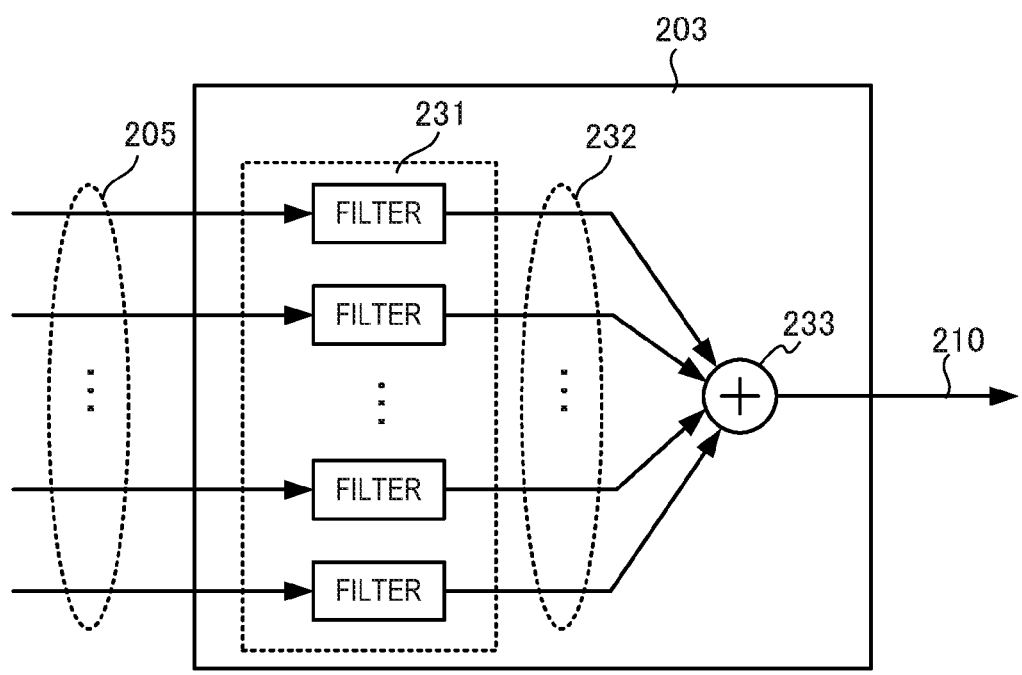
F I G. 2B

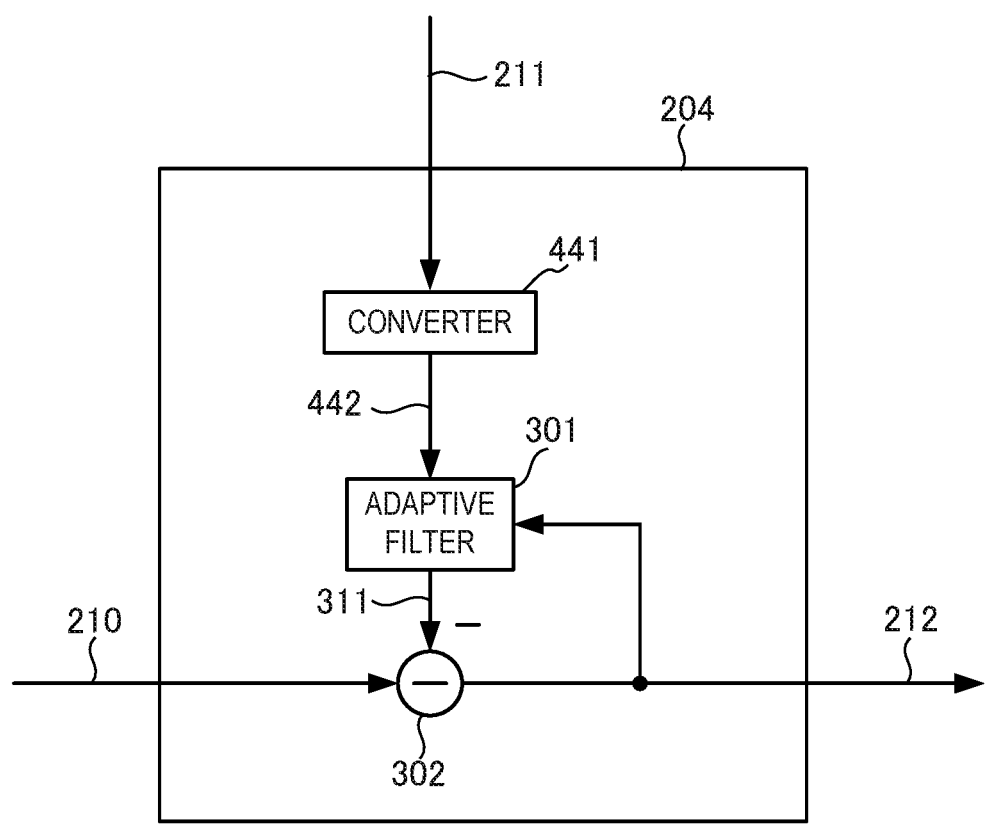
F I G. 4

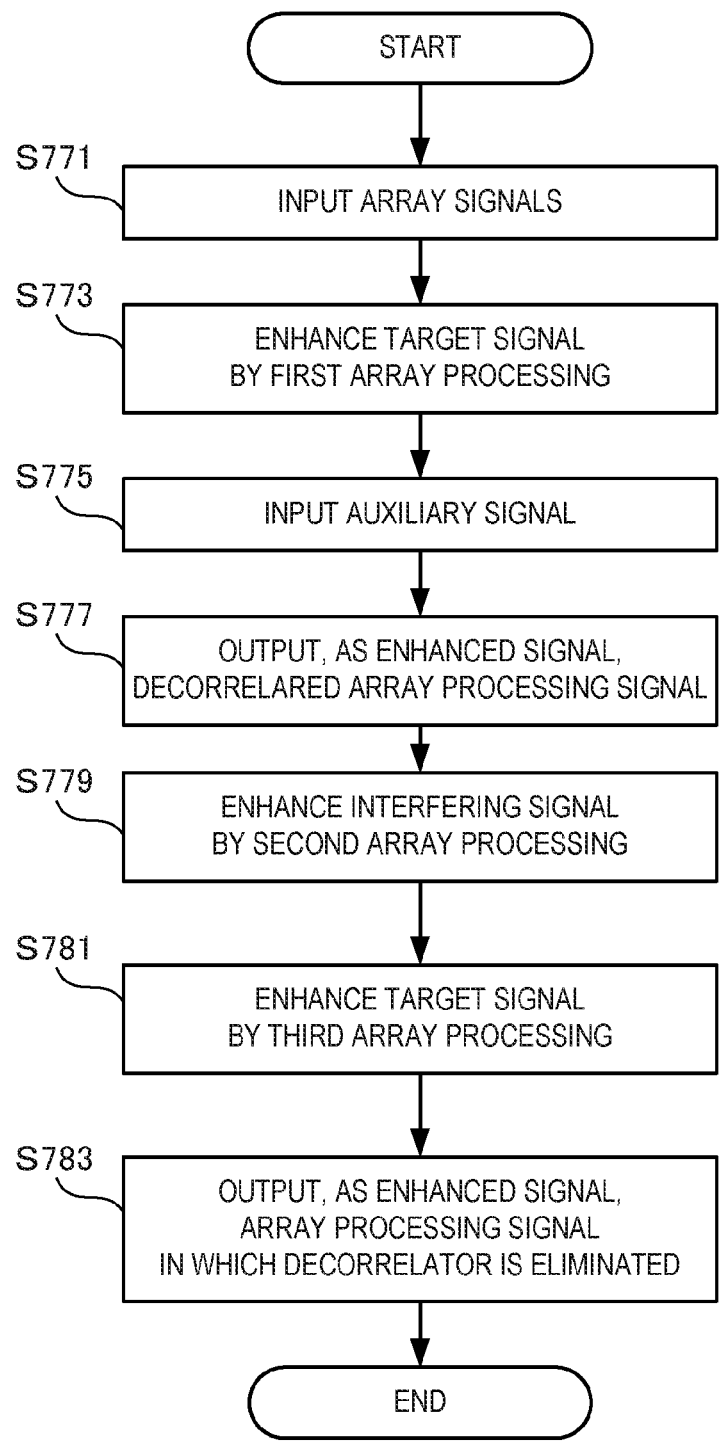
F I G. 7C

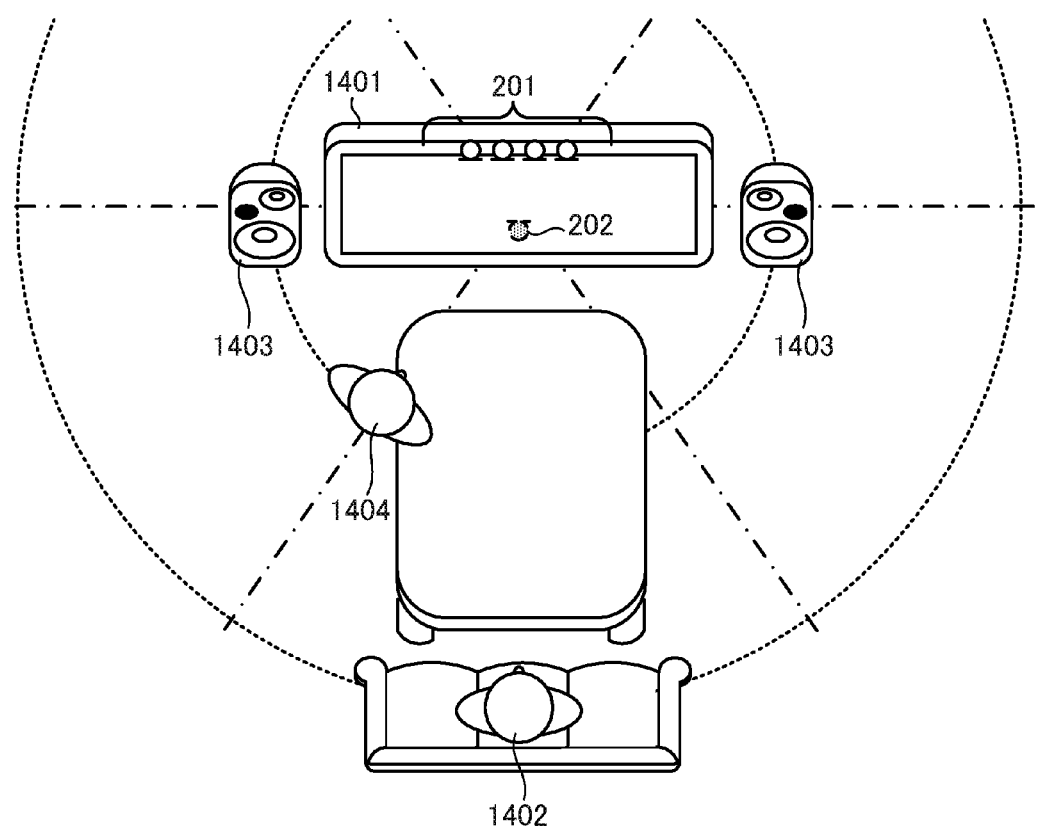
F I G. 14

SIGNAL PROCESSING APPARATUS, MEDIUM APPARATUS, SIGNAL PROCESSING METHOD, AND SIGNAL PROCESSING PROGRAM

This application is a National Stage Entry of PCT/JP2014/070807 filed on, Aug. 7, 2014, which claims priority from Japanese Patent Application 2013-209731 filed on Oct. 4, 2013, the contents of all of which are incorporated herein by reference, in their entirety.

TECHNICAL FIELD

The present invention relates to a technique of enhancing or suppressing a signal using directivity formed by a plurality of sensors.

BACKGROUND ART

In the above technical field, non-patent literatures 1 and 2 disclose techniques of enhancing a target signal and suppressing an interfering signal by processing a plurality of sensor signals to generate an enhanced target signal, suppressing the target signal to generate a pseudo interfering signal in which an interfering signal is relatively enhanced, and subtracting a component correlated with the pseudo interfering signal from the enhanced target signal. In these techniques, directivity is formed using a phase difference between signals based on a difference in spatial position between a plurality of sensors, and a specific signal is enhanced or suppressed based on the formed directivity. Furthermore, non-patent literatures 3 and 4 describe arrangements obtained by combining the techniques of non-patent literatures 1 and 2 in a plurality of frequency bands from a low band to a high band using a plurality of arrays with different sensor intervals.

CITATION LIST

Non-Patent Literature

Non-patent literature 1: IEEE Transactions on Antennas and Propagations, Vol. 30, No. 1, pp. 27-34, January 1982.
Non-patent literature 2: CH. 5, Microphone Arrays, Springer, Berlin Heidelberg New York, 2001.
Non-patent literature 3: Journal of Acoustical Society of America, Vol. 78, No. 5, pp. 1508-1818, May 1985.
Non-patent literature 4: IEEE Proceedings of International Conference on Acoustics, Speech, And Signal Processing, Vol. V, pp. 2995-2998, May 1995.
Non-patent literature 5: CH. 46.5, Handbook of Speech Processing, Springer, Berlin Heidelberg New York, 2008.
Non-patent literature 6: SEC. 8, Adaptive Filtering, Prediction and Control, Prentice-Hall, Englewood Cliffs, 1984.
Non-patent literature 7: IEEE Transactions on Acoustics, Speech, and Signal Processing, Vol. 9, No. 1, pp. 14-37, January 1992.
Non-patent literature 8: IEEE Signal Processing Magazine, Vol. 31, No. 3, pp. 609-615, June 1983.

SUMMARY OF THE INVENTION

Technical Problem

In the techniques described in the above non-patent literatures 1 and 2, however, sufficient directivity cannot be formed with respect to a signal component of a low frequency. This is because if a sensor common to medium and high frequencies is used at a low frequency at which a wavelength is longer than those at the medium and high frequencies, a sensor interval which becomes relative narrow cannot generate a sufficiently large signal phase difference between a plurality of sensors. In the techniques described in non-patent literatures 3 and 4, an increase in cost caused by the increased number of sensors and an increase in array size caused by a wide sensor interval corresponding to the low band become a problem.

These techniques described in the literatures cannot enhance or suppress a wideband signal using the directivity of a sensor array without increasing the size of the sensor array or the number of sensors.

The present invention enables to provide a technique of solving the above-described problem.

Solution to Problem

One aspect of the present invention provides a signal processing apparatus comprising:
a first array processor that generates a first array processing signal by partially enhancing a predetermined signal among signals received from a plurality of sensors; and
a decorrelator that generates a decorrelated signal by removing, from the first array processing signal, a signal component correlated with a signal received from an auxiliary sensor different from the plurality of sensors.

Another aspect of the present invention provides a signal processing method comprising:
generating an array processing signal by partially enhancing a predetermined signal among signals received from a plurality of sensors; and
generating a decorrelated signal by removing, from the array processing signal, a signal component correlated with a signal received from an auxiliary sensor different from the plurality of sensors.

Still other aspect of the present invention provides a signal processing program for causing a computer to execute a method, comprising:
generating an array processing signal by partially enhancing a predetermined signal among signals received from a plurality of sensors; and
generating a decorrelated signal by removing, from the array processing signal, a signal component correlated with a signal received from an auxiliary sensor different from the plurality of sensors.

Still other aspect of the present invention provides a medium apparatus comprising:
a plurality of sensors arranged on a front surface;
an auxiliary sensor arranged at a position at which an acoustic characteristic is different from those of the plurality of sensors;
an array processor that generates an array processing signal by partially enhancing a predetermined signal among signals received from the plurality of sensors; and
a decorrelator that generates a decorrelated signal by removing, from the array processing signal, a signal component correlated with a signal received from the auxiliary sensor.

Advantageous Effects of Invention

According to the present invention, it is possible to enhance or suppress a wideband signal using the directivity of a sensor array without increasing the size of the sensor array.

BRIEF DESCRIPTION OF DRAWINGS

FIG. 1 is a block diagram showing the arrangement of a signal processing apparatus according to the first embodiment of the present invention;

FIG. 2A is a block diagram showing the arrangement of a signal processing apparatus according to the second embodiment of the present invention;

FIG. 2B is a block diagram showing the arrangement of an array processor 203 according to the second embodiment of the present invention;

FIG. 4 is a block diagram showing the arrangement of a decorrelator according to the third embodiment of the present invention;

FIG. 7C is a flowchart for explaining the processing sequence of the signal processing apparatus according to the fifth embodiment of the present invention;

FIG. 14 is a block diagram showing the second application example of the first to eighth embodiments of the present invention.

DESCRIPTION OF THE EMBODIMENTS

Figure 3:
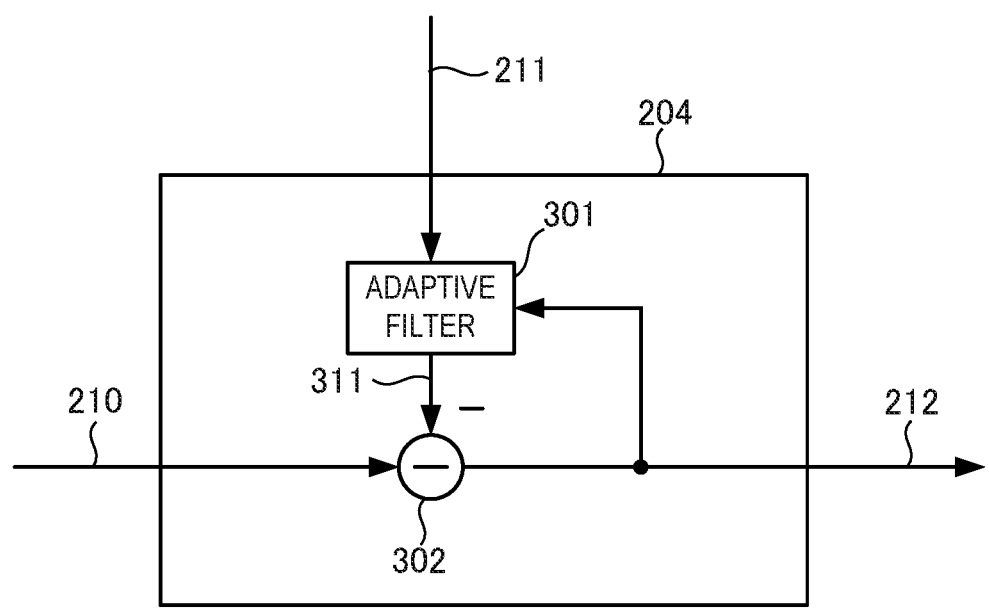
FIG. 3 is a block diagram showing the arrangement of a decorrelator according to the second embodiment of the present invention.

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise. Note that "speech signal" in the following explanation indicates a direct electrical change that occurs in accordance with speech or another audio and transmits the speech or the other audio, and is not limited to speech.

[First Embodiment]

A signal processing apparatus 100 according to the first embodiment of the present invention will be described with reference to FIG. 1. The signal processing apparatus 100 is an apparatus for enhancing or suppressing a wideband signal using signals from a plurality of sensors 101.

As shown in FIG. 1, the signal processing apparatus 100 includes an array processor 103 and a decorrelator 104.

The array processor 103 generates an array processing signal 110 by partially enhancing a predetermined signal with respect to signals 105 received from the plurality of sensors 101.

The decorrelator 104 generates a decorrelated signal 112 by removing, from the array processing signal 110, a signal component correlated with a signal 121 received from an auxiliary sensor 102 different from the plurality of sensors 101.

With the above arrangement, the signal processing apparatus 100 can effectively enhance or suppress a wideband signal using signals from a sensor array.

[Second Embodiment]

<<Overall Arrangement>>

A signal processing apparatus 200 according to the second embodiment of the present invention will be described with reference to FIGS. 2 to 4. The signal processing apparatus 200 according to this embodiment is applicable to signal enhancement in various medium apparatuses, for example, a digital camera, a video recorder, a personal computer, a mobile phone, a television receiver, a voice recorder, a game machine, and an automatic vending machine. That is, the target signal of speech, music, environmental sound, or the like can be enhanced relative to a signal (noise or interfering signal) superimposed on it. However, the present invention is not limited to this, and is applicable to a signal processing apparatus of any type required to enhance a specific signal included in an input signal.

Note that in this embodiment, a signal enhancement apparatus for enhancing speech superimposed on background noise or interfering signal will be described as an example of signal processing. The signal processing apparatus 200 according to this embodiment appropriately suppresses background noise or another signal interfering with a speech command based on the direction of the noise or signal in, for example, a form of a speech recognition apparatus for controlling a television receiver from a position away from it using the speech command. Simply speaking, as for a high frequency component, directivity is formed by processing a plurality of sensor signals, thereby enhancing speech. As for a low frequency component, a signal other than speech is suppressed to enhance the speech by removing a component correlated with a signal of an auxiliary sensor arranged at a position, where the speech is hardly input, using the signal of the auxiliary sensor as a reference signal.

FIG. 2A shows the overall arrangement of the signal processing apparatus 200 according to this embodiment. The schematic arrangement is the same as that shown in FIG. 1, and includes an array processor 203 and a decorrelator 204.

The array processor 203 forms directivity by performing array processing for input signals 205 received from the respective sensors of a sensor array 201, and outputs a first array processing signal 210 in which the target signal is enhanced.

The decorrelator 204 removes, from the first array processing signal 210, a component correlated with an input signal 211 received from an auxiliary sensor 202 by using the input signal 211 as a reference signal, and outputs a resultant signal as a decorrelated signal 212. By arranging the sensor 202 at a position in an acoustic space where the target signal is hardly input or installing an acoustic shielding object, which makes it difficult to input the target signal, nearby, the input signal 211 is prevented from containing a component correlated with the target signal as much as possible. The decorrelated signal 212 is supplied to an output terminal 209 as an output signal.

The array processor 203 mainly suppresses a high frequency component other than the target signal based on the directivity. The decorrelator 204 mainly suppresses a low frequency component other than the target signal based on decorrelation.

<<Arrangement of Array Processor 203>>

FIG. 2B is a block diagram showing the arrangement of the array processor 203. The array processor 203 includes M filters 231 and an adder 233 where M is a natural number representing the number of sensors. The input signals 205 are respectively supplied to the filters 231 from the sensor array 201. The filters 231 respectively filter the input signals 205, and supply obtained output signals 232 to the adder 233. The adder 233 adds all the signals supplied from the filters 231, and outputs an addition result as the first array processing signal 210 in which the target signal is enhanced and the remaining components are suppressed.

The arrangement shown in FIG. 2B is known as a filter-and-sum beamformer. If all the filters 231 are finite impulse response (FIR) filters, and one of the tap coefficients of the filters is 1 and the remaining coefficients are all 0s, FIG. 2B shows the arrangement known as a delay-and-sum beamformer. More specifically, the non-zero tap coefficient is set to rotate (steer) the wave front direction of a plane wave coming from a specific direction. Non-patent literature 5 discloses the filter-and-sum beamformer and delay-and-sum beamformer. The array processor 203 is known as a fixed beamformer for forming a generalized side-lobe canceller (Griffiths-Jim beamformer). The arrangement example and operation of the array processor 203 are disclosed in detail in non-patent literatures 1 and 2.

<<Arrangement of Decorrelator 204>>

FIG. 3 is a block diagram showing the first arrangement example of the decorrelator 204. The decorrelator 204 includes an adaptive filter 301 and a subtractor 302. The adaptive filter 301 receives the input signal 211 in which components other than the target signal are dominant, and supplies a filter processing result to the subtracter 302 as an output 311. As another input of the subtractor 302, the array processing signal 210 in which the target signal is enhanced and the remaining components are suppressed is supplied. The subtractor 302 subtracts the output 311 of the adaptive filter 301 from the array processing signal 210, and outputs the difference as the decorrelated signal 212. The decorrelated signal 212 is fed back to the adaptive filter 301 as an error. The adaptive filter 301 obtains the correlation between the decorrelated signal 212 and the input signal 211, and sequentially updates the filter coefficients in accordance with the degree of correlation. As a filter coefficient adaptation algorithm, various algorithms such as an LMS algorithm and an NLMS algorithm can be used. Non-patent literature 6 and the like disclose details of the coefficient adaptation algorithm.

In the arrangement shown in FIG. 3, the input signal 211 can be divided into a plurality of frequency bands by a filter bank to perform filter processing using an individual adaptive filter in each frequency band, the input signal 211 can be divided into a plurality of frequency bands by the filter bank to subtract a filter processing result from the input signal 210 having undergone band division by an individual subtractor in each frequency band, and subtraction results can be combined into one band by the filter bank, thereby obtaining the decorrelated signal 212. At this time, the output of each subtractor is fed back to each adaptive filter. The adaptive filter 301 calculates the correlation between the output of the subtractor which has been fed back and the input signal 210 having undergone band division, and sequentially updates the adaptive filter coefficients in accordance with the degree of correlation. This arrangement is known as sub-band filter processing. Non-patent literature 7 discloses details of sub-band filter processing.

The array processor 203 suppresses the components other than the target signal using the directivity, and the decorrelator 204 suppresses the components other than the target signal by decorrelation based on the input signal 211. More specifically, the array processor 203 effectively operates for the high frequency components, and the decorrelator 204 effectively operates for the low frequency components. Since the decorrelator 204 removes the low frequency components, even if the sensor array 201 is small in size, it is possible to suppress signals in a wide frequency band from a low frequency to a high frequency. With the above arrangement, it is possible to suppress a wideband signal and sufficiently enhance a target signal without increasing the array size or the number of sensors.

[Third Embodiment]

A signal processing apparatus according to the third embodiment of the present invention will be described with reference to FIG. 4. This embodiment is different from the above second embodiment in that a converter 441 is added to a decorrelator 204 according to this embodiment. The remaining components and operations are the same as those in the second embodiment. Hence, the same reference numerals denote the same components and operations, and a detailed description thereof will be omitted. Only the difference in the arrangement of the decorrelator 204 will be explained.

FIG. 4 is a block diagram showing the arrangement of the decorrelator 204. The decorrelator 204 includes the converter 441, an adaptive filter 301, and a subtractor 302. Upon receiving an input signal 211 in which components other than a target signal are dominant, the converter 441 generates a frequency domain signal by separating the input signal 211 into a plurality of frequency components. Upon receiving the frequency domain signal, the adaptive filter 301 performs weighted addition of signal values corresponding to a plurality of frequency components, and supplies an obtained addition result to the subtractor 302 as an output 311. As another input of the subtractor 302, an array processing signal 210 in which the target signal is enhanced is supplied. The subtractor 302 subtracts the output 311 of the adaptive filter 301 from the array processing signal 210, and outputs the difference as a first decorrelated signal 212.

The decorrelated signal 212 is fed back to the adaptive filter 301 as an error. The adaptive filter 301 obtains the correlation between the decorrelated signal 212 and an output signal 442 of the converter 441, and subsequently updates the filter coefficients in accordance with the degree of correlation.

With the above-described operation of the decorrelator 204, a component correlated with the components other than the target signal contained in the decorrelated signal 212 is minimized. As a result, the decorrelated signal 212 is a signal in which the target signal is enhanced and the remaining components are suppressed. Non-patent literature 8 discloses details of the arrangement of the converter 441 shown in FIG. 4.

[Fourth Embodiment]

Figure 5:
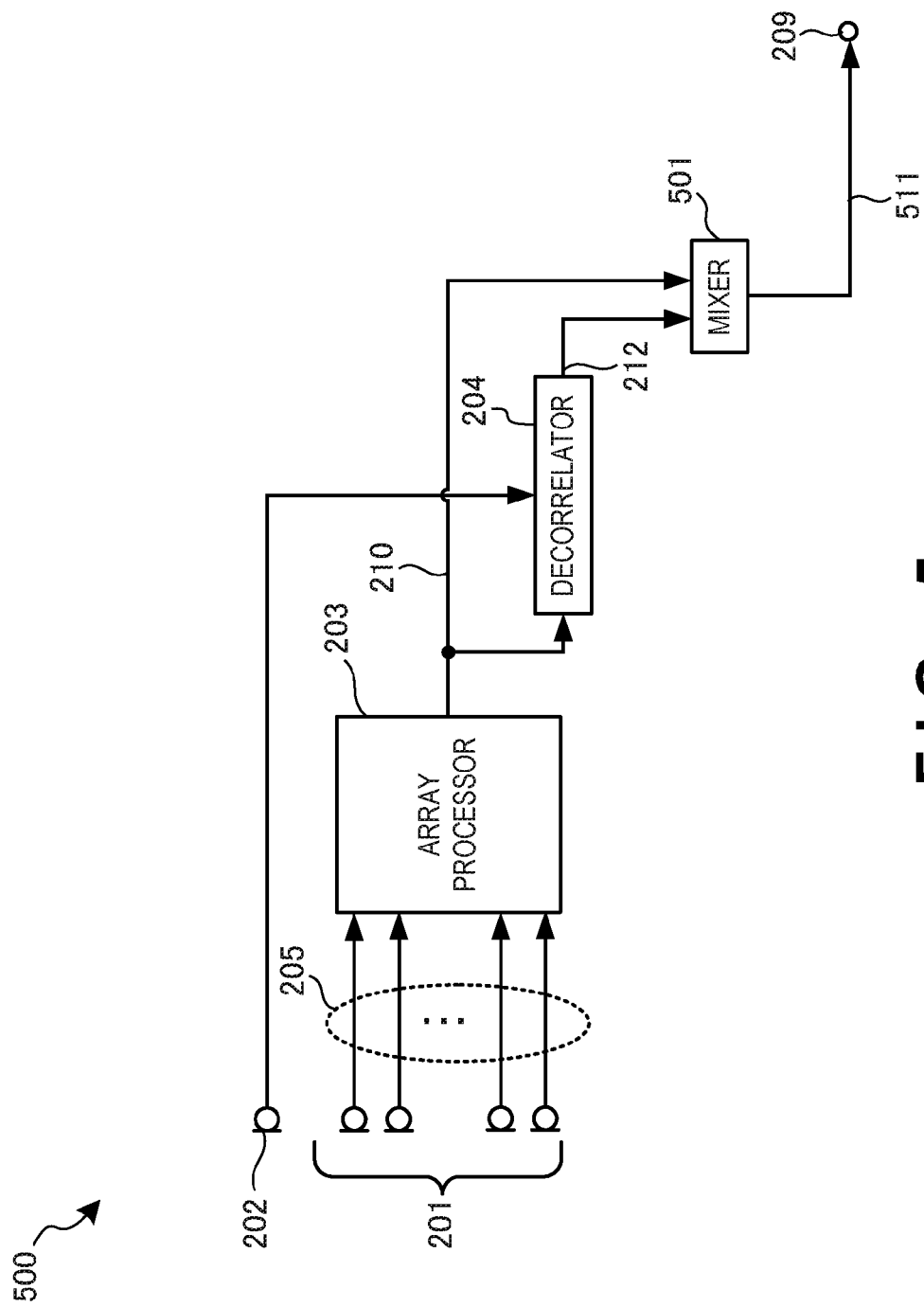
FIG. 5 is a block diagram showing the arrangement of a signal processing apparatus according to the fourth embodiment of the present invention.

A signal processing apparatus 500 according to the fourth embodiment of the present invention will be described with reference to FIG. 5. This embodiment is different from the above first embodiment in that a mixer 501 is added to the signal processing apparatus 500 and a mixed signal of a decorrelated signal 212 and an array processing signal 210 is supplied to an output terminal 209 as a mixed signal 511. The remaining components and operations are the same as those in the first embodiment. Hence, the same reference numerals denote the same components and operations, and a detailed description thereof will be omitted. Only the operation of the mixer 501 will be explained.

The decorrelated signal 212 as an output of a decorrelator 204 and the array processing signal 210 as an output of an array processor 203 are supplied to the mixer 501. The mixer 501 mixes the decorrelated signal 212 and the array processing signal 210 to generate the mixed signal 511, and supplies the mixed signal 511 to the output terminal 209.

Figure 6:
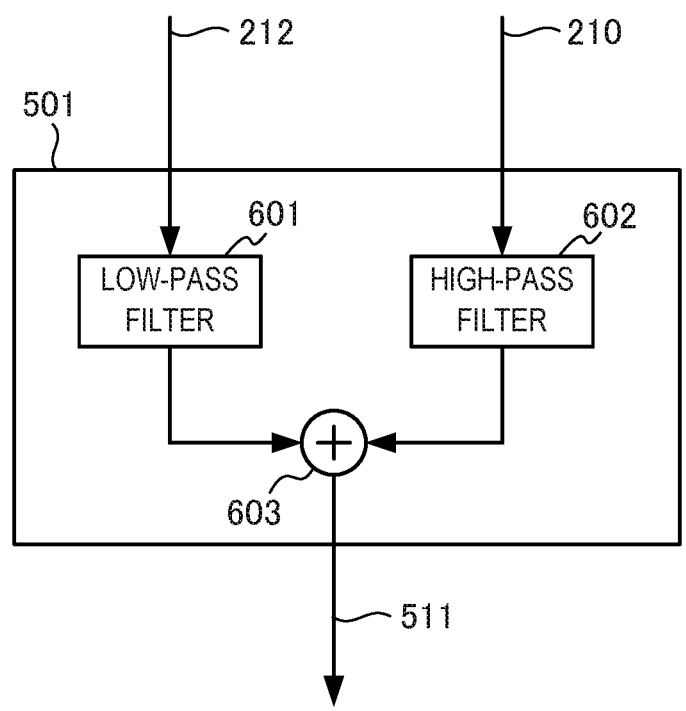
FIG. 6 is a block diagram showing the arrangement of a mixer according to fourth embodiment of the present invention.

FIG. 6 is a block diagram showing the arrangement of the mixer 501. The mixer 501 includes a low-pass filter 601, a high-pass filter 602, and an adder 603. The low-pass filter 601 receives the decorrelated signal 212, passes only a low frequency component, and supplies it to the adder 603. The high-pass filter 602 receives the array processing signal 210, passes only a high frequency component, and supplies it to the adder 603. The adder 603 mixes the low frequency component of the decorrelated signal 212 and the high frequency component of the array processing signal 210 at a predetermined ratio, and outputs a resultant signal as the mixed signal 511.

The adder 603 can perform simple addition, and may perform weighted addition. Weights of the outputs of the low-pass filter 601 and high-pass filter 602 can be determined in advance, or can sequentially, adaptively determined using the result of analyzing the frequency spectrum of the signal. For example, if the signal has a spectrum in which components other than the target signal concentrate in the low band, a larger weight is applied to the output of the low-pass filter 601. By setting the weights in this way, the effect of the decorrelator 204 becomes relatively larger than that of the array processor 203, and thus a larger suppression effect can be expected in the sum signal.

Similarly, setting of the passing band of the low-pass filter 601 and the passing band of the high-pass filter 602 can be sequentially, adaptively determined based on the result of analyzing the frequency spectrum of the signal. For example, if the signal has a spectrum in which the components other than the target signal concentrate in the low band, the passing band of the low-pass filter 601 is set wide and the passing band of the high-pass filter 602 is set narrow. By setting the passing bands in this way, the effect of the decorrelator 204 becomes relatively larger than that of the array processor 203, and thus a larger suppression effect can be expected in the sum signal.

Furthermore, the output of the low-pass filter 601 and the passing band of the high-pass filter 602 can be set in accordance with a sensor interval. If, for example, the sensor interval is narrow, the passing band of the low-pass filter 601 is set wide and the passing band of the high-pass filter 602 is set narrow. Such passing band setting makes the effect of the decorrelator 204 relatively larger than that of the array processor 203, and thus a larger suppression effect can be expected in the sum signal.

The decorrelated signal 212 is more largely suppressed in terms of the low frequency component of the components other than the target signal, and the array processing signal is more largely suppressed in terms of the high frequency component of the components other than the target signal. The mixed signal 511 obtained by mixing the low frequency component of the decorrelated signal 212 and the high frequency component of the array processing signal 210 has the merits of these signals, and thus has a high suppression effect of the components other than the target signal as compared with each of the signals.

As described above, in this embodiment, instead of the decorrelated signal 212, the mixed signal 511 of the decorrelated signal 212 and array processing signal 210 is supplied to the output terminal 209 as an output. This can obtain a high quality signal in which the components other than the target signal are further suppressed, as compared with the second embodiment. That is, it is possible to suppress a wideband signal and sufficiently enhance a target signal without increasing the array size or the number of sensors.

[Fifth Embodiment]

A signal processing apparatus 700 according to the fifth embodiment of the present invention will be described with reference to FIG. 7A. This embodiment is different from the above fourth embodiment in that array processors 706 and 708 are added to the signal processing apparatus 700. The remaining components and operations are the same as those in the first embodiment. Hence, the same reference numerals denote the same components and operations, and a detailed description thereof will be omitted. Only the operations of the array processors 706 and 708 will be explained.

Using a decorrelated signal 212 as a reference signal, the array processor 706 removes a signal component correlated with the decorrelated signal 212 from each of input signals 205 received from the respective sensors of a sensor array 201, and outputs an array processing signal 707 in which a target signal is suppressed. Since the array processor 706 removes the signal component correlated with the decorrelated signal 212 in which the target signal is enhanced, the array processing signal 707 is a signal in which the target signal is suppressed and the remaining components are enhanced.

Using the array processing signal 707 as a reference signal, the array processor 708 removes a signal component contained in an array processing signal 210 and correlated with the array processing signal 707, and outputs a resultant signal as an array processing signal 713 in which the components other than the target signal are suppressed. That is, the array processing signal 713 of the array processor 708 is a signal in which the target signal is enhanced and the remaining signals are suppressed.

<<Arrangement of Array Processor 706>>

Figure 8:
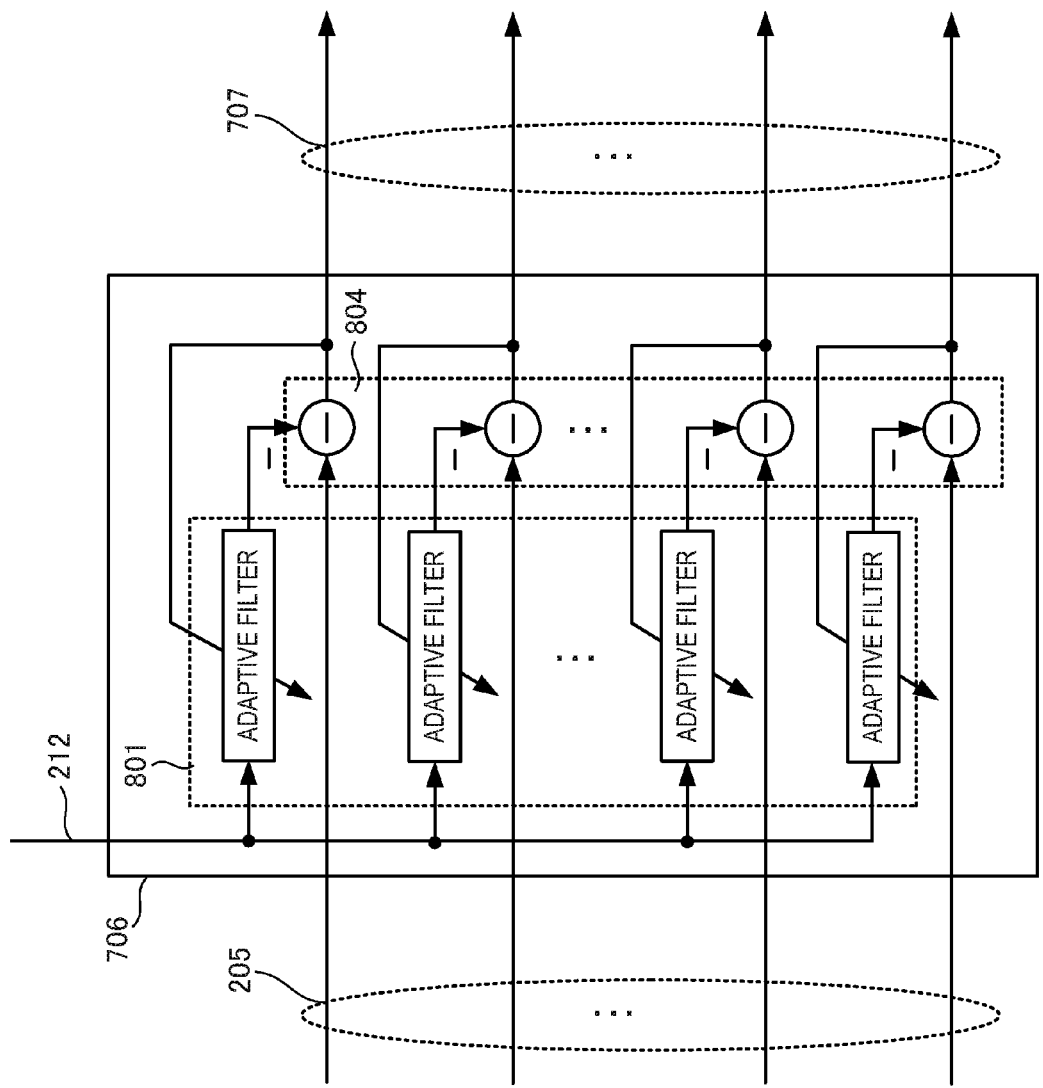
FIG. 8 is a block diagram showing the arrangement of an array processor 706 according to the fifth embodiment of the present invention.

FIG. 8 is a block diagram showing the arrangement of the array processor 706. The array processor 706 includes M adaptive filters 801 and M subtractors 804. A decorrelator 204 supplies the decorrelated signal 212 to the adaptive filters 801. Each adaptive filter 801 performs filter processing for the signal, and supplies a filter processing result to the corresponding subtractor 804. The input signals 205 received from the respective sensors of the sensor array 201 are supplied to the subtractors 804, respectively. Each subtractor 804 subtracts the output of the corresponding adaptive filter 801 from the input signal 205, and outputs the resultant difference as the array processing signal 707. The array processing signal 707 is fed back to the corresponding adaptive filter 801 as an error. Each adaptive filter 801 obtains the correlation between the array processing signal 707 and the decorrelated signal 212, and sequentially updates the filter coefficients in accordance with the degree of correlation.

With the above-described operation, the component correlated with the target signal contained in each input signal 205 is minimized. As a result, each array processing signal 707 is a signal in which the target signal is suppressed and the remaining signals are enhanced.

The array processor 706 is known as a blocking matrix for forming a generalized side-lobe canceller (Griffiths-Jim beamformer). The arrangement example and operation of the array processor 706 are disclosed in detail in non-patent literatures 1 and 2.

<<Arrangement of Array Processor 708>>

Figure 9:
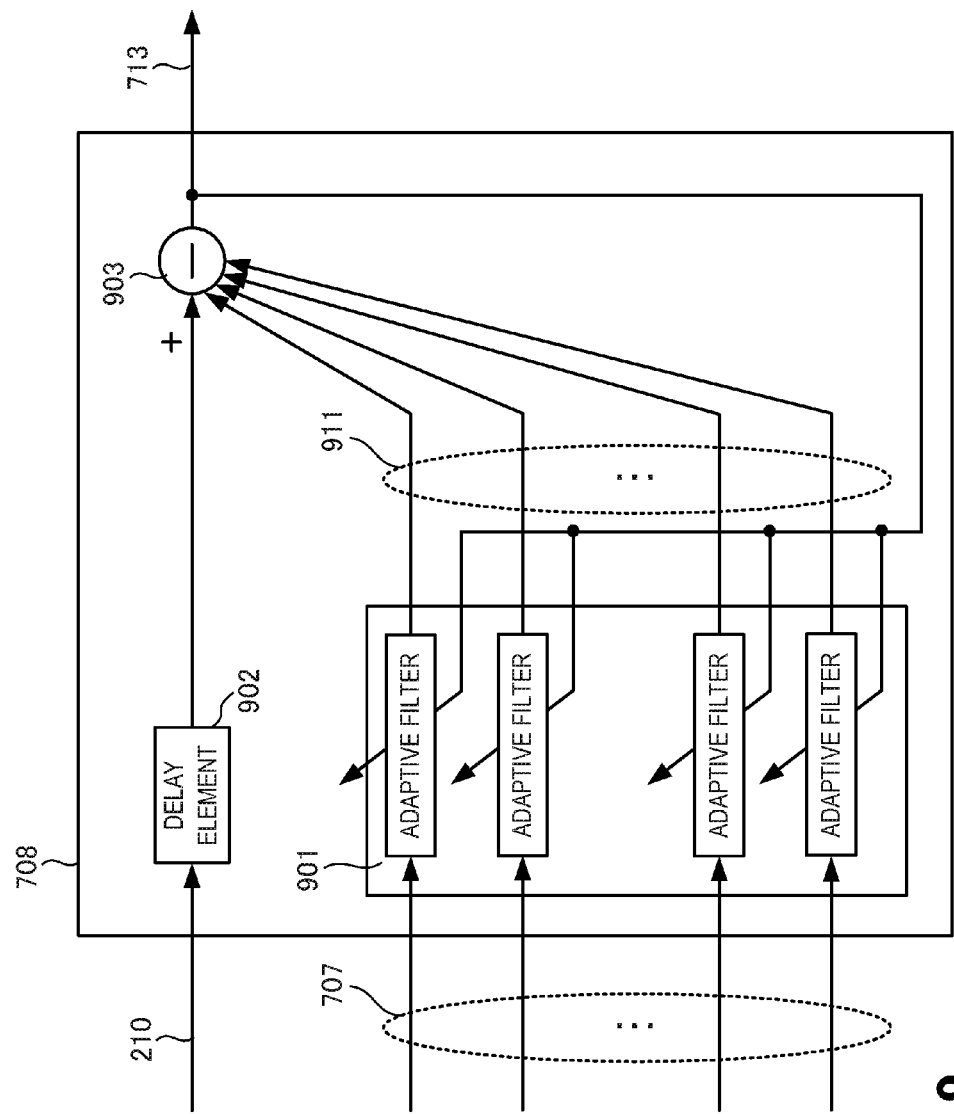
FIG. 9 is a block diagram showing the arrangement of an array processor 708 according to the fifth embodiment of the present invention.

FIG. 9 is a block diagram showing the arrangement of the array processor 708. The array processor 708 includes M adaptive filters 901, a delay element 902, and a subtractor 903. The array processing signals 707 are supplied to the adaptive filters 901, respectively. Each adaptive filter 901 performs filter processing for the signal, and supplies a output signals (filter processing result) 911 to the subtractor 903. The delay element 902 delays the array processing signal 210, and supplies the delayed array processing signal to the subtractor 903. The subtractor 903 subtracts all the output signals 911 of the adaptive filters 901 from the delayed array processing signal, and outputs the obtained result as the array processing signal 713.

The array processing signal 713 is fed back to all the adaptive filters 901 as an error. Each adaptive filter 901 obtains the correlation between the array processing signal 713 and the array processing signal 707, and subsequently updates the filter coefficients in accordance with the degree of correlation.

The array processor 708 is known as a multiple-input canceller for forming a generalized side-lobe canceller (Griffiths-Jim beamformer). The arrangement example and operation of the array processor 708 are disclosed in detail in non-patent literatures 1 and 2.

As described above, according to this embodiment, the signal component correlated with the decorrelated signal 212 is removed using the decorrelated signal 212 as a reference signal, and the array processing signal 707 in which the target signal is suppressed and the remaining components are enhanced is generated. Furthermore, the signal component contained in the array processing signal 210 and correlated with the array processing signal 707 is removed using the array processing signal 707 as a reference signal, and a resultant signal is output as the array processing signal 713 in which the target signal is enhanced and the remaining signals are suppressed. Consequently, it is possible to obtain a high quality signal in which the components other than the target signal are further suppressed, as compared with the first embodiment. That is, it is possible to suppress a wideband signal and sufficiently enhance a target signal without increasing the array size or the number of sensors.

<<Relationship with Generalized Side-Lobe Canceller>>

As disclosed in non-patent literature 1 and 2, an array processor 203 and the array processors 706 and 708 are respectively known as a fixed beamformer, blocking matrix, and multiple-input canceller, each of which forms a generalized side-lobe canceller (Griffiths-Jim beamformer). The arrangement examples and operations of the array processors 203, 706, and 708 are disclosed in detail in non-patent literatures 1 and 2.

The array processor 203 enhances the target signal using signals obtained by the respective sensors of the sensor array 201. However, in the output signal of the array processor 203, the components other than the target signal especially in the low band are not sufficiently suppressed. This is because the sensor interval of the sensor array 201 is not sufficiently wide with respect to the wavelength in the low band, and directivity formed by the array processor 203 is insufficient especially in the low band, as described above.

In the generalized side-lobe canceller, using, as a reference signal, the output of the array processor 203 in which the target signal is enhanced (the remaining components are suppressed), the array processor 706 generates the second array processing signal in which the components other than the target signal are enhanced (the target signal is suppressed). Since the components other than the target signal are not sufficiently suppressed in the output of the array processor 203, the components other than the target signal are not sufficiently enhanced (the target signal is not sufficiently suppressed) in the output of the array processor 706 which operates using the output signal of the array processor 203 as a reference signal. Therefore, the array processor 708 which removes a signal component correlated with the output of the array processor 706 from the output of the array processor 203 cannot sufficiently remove the components other than the target signal from the output of the array processor 203, and thus the components other than the target signal, especially low frequency components remain in an output signal 713.

Figure 7A:
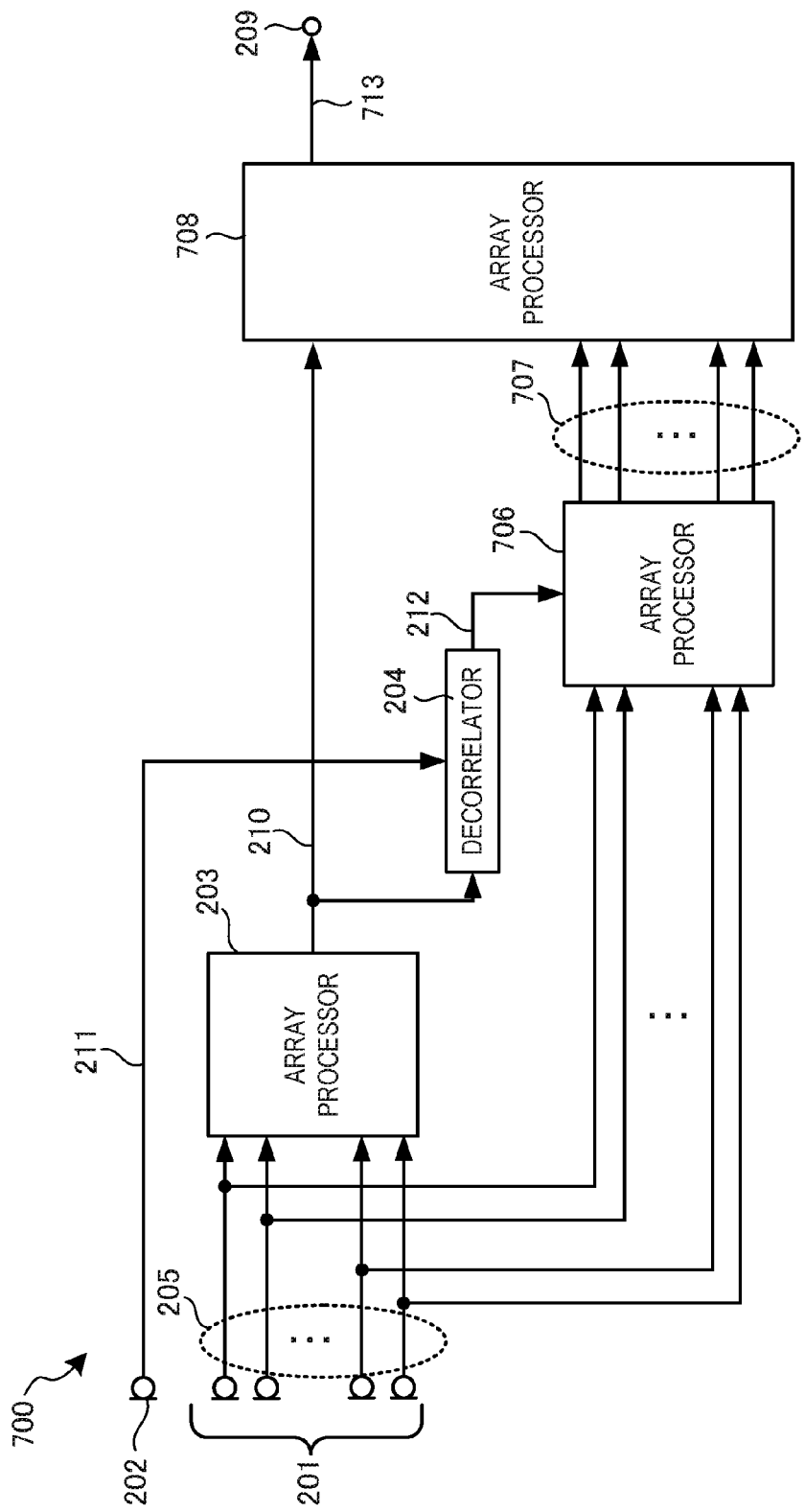
FIG. 7A is a block diagram showing the arrangement of a signal processing apparatus according to the fifth embodiment of the present invention.

In the embodiment shown in FIG. 7A, the array processor 706 suppresses the target signal using, as a reference signal, the elimination signal 212 of the decorrelator 204 instead of the array processing signal 210 of the array processor 203. The decorrelator 204 removes a signal correlated with an input signal 211, that is, signal components other than the target signal using the input signal 211 as a reference signal, and performs no array processing. Therefore, the components other than the target signal contained in the decorrelated signal 212 are minimized regardless of the relationship between the sensor interval of the array and the frequency of the signal to be processed.

As described above, since the decorrelated signal 212 in which the components other than the target signal are sufficiently suppressed, as compared with the array processing signal 210, is used as a reference signal, the array processor 706 can generate the array processing signal 707 in which the target signal is sufficiently suppressed.

Consequently, the array processor 708 which removes the signal component correlated with the output of the array processor 706 from the output of the array processor 203 can sufficiently remove the components other than the target signal in the output of the array processor 203, and the components other than the target signal, especially the low frequency components never remain in the output signal 713.

Figure 7B:
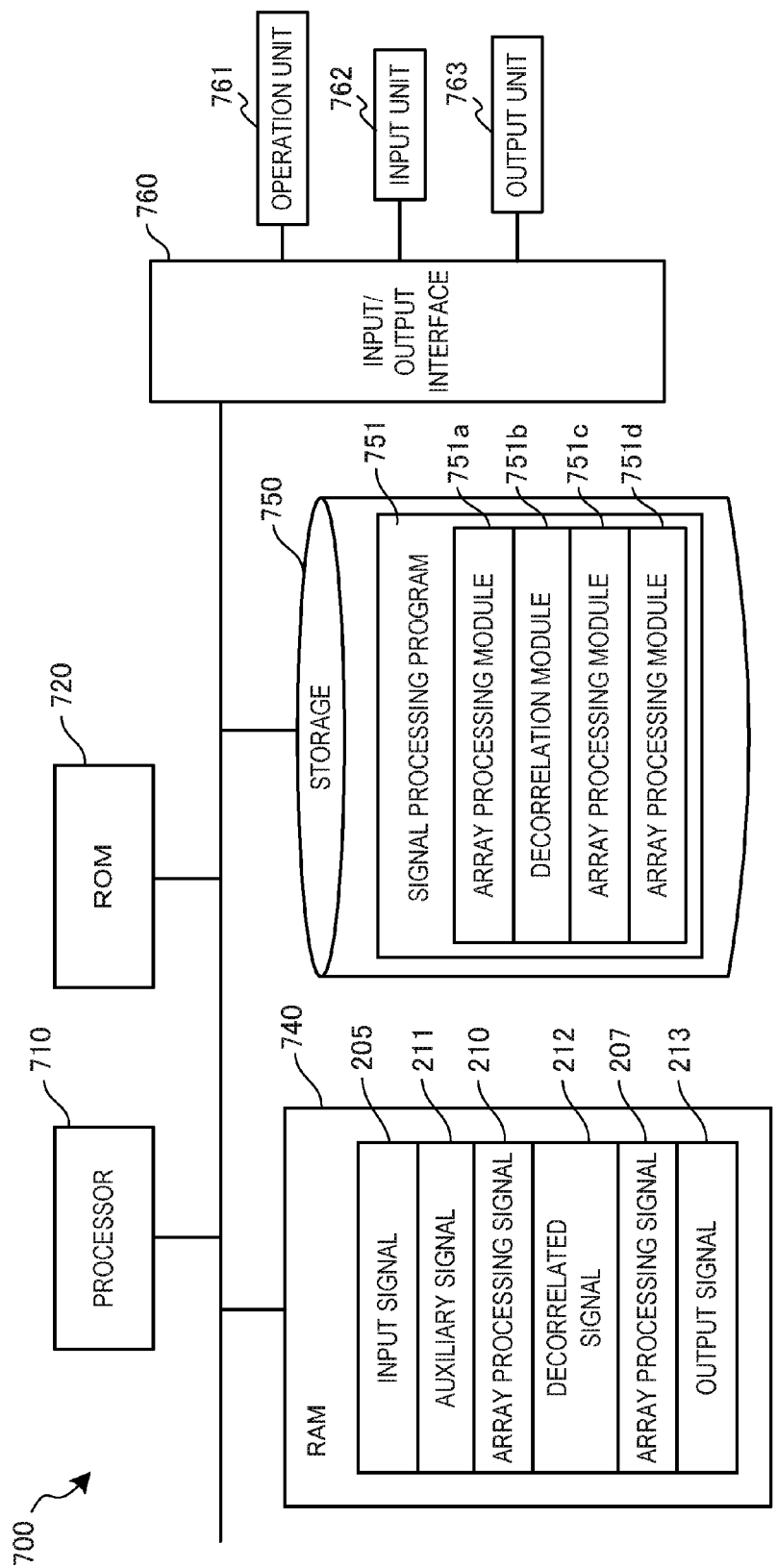
FIG. 7B is a block diagram showing the hardware arrangement of the signal processing apparatus according to the fifth embodiment of the present invention.

FIG. 7B is a block diagram for explaining a hardware arrangement when the signal processing apparatus 700 according to this embodiment is implemented using software.

The signal processing apparatus 700 includes a processor 710, a ROM (Read Only Memory) 720, a RAM (Random Access Memory) 740, a storage 750, an input/output interface 760, an operation unit 761, an input unit 762, and an output unit 763. The processor 710 is a central processing unit, and controls the overall signal processing apparatus 700 by executing various programs.

The ROM 720 stores a boot program to be executed first by the processor 710, various parameters, and the like. The RAM 740 has a program load area (not shown), and an area for storing the input signal 205, auxiliary input signal 211, array processing signal 210, decorrelated signal 212, an array processing signal 707, an array processing signal 713 (output signal), and the like.

The storage 750 stores a signal processing program 751. The signal processing program 751 includes an array processing module 751a, a decorrelation module 751b, and array processing modules 751c and 751d. When the processor 710 executes the modules included in the signal processing program 751, the functions of the array processor 203, decorrelator 204, and array processors 706 and 708 shown in FIG. 7A can be implemented.

The array processing signal 713 as an output associated with the signal processing program 751 executed by the processor 710 is output from the output unit 763 via the input/output interface 760. This can suppress noise or interfering signal contained in the input signal 205 input from the input unit 762, and enhance the target signal such as speech.

FIG. 7C is a flowchart for explaining a processing sequence of enhancing the target signal such as speech mixed in noise or interfering signal, which is executed by the signal processing program 751. In step S771, the plurality of input signals 205 are supplied to the array processor 203 from the sensor array 201. In step S773, the array processor 203 executes enhancement processing of speech, that is, the target signal as the first array processing, thereby generating the array processing signal 210.

In step S775, processing of inputting the auxiliary signal 211 from the sensor 202 and supplying it to the decorrelator 204 is executed. In step S777, the decorrelator 204 removes a component contained in the array processing signal 210 and correlated with the auxiliary signal 211 using the auxiliary signal 211 as a reference signal, thereby generating the decorrelated signal 212. In step S779, as the second array processing, the array processor 706 removes speech, that is, a target signal component contained in the input signal 205 using the decorrelated signal 212 as a reference signal, thereby generating the array processing signal 707. In step S781, an interfering signal component contained in the array processing signal 210 is removed using, as a reference signal, the array processing signal 707 as an enhanced interfering signal, thereby generating the array processing signal 713 in which speech, that is, the target signal is enhanced.

Finally, in step S783, the array processing signal 713 is output as a signal in which the target signal, that is, the speech is enhanced and the remaining signals are suppressed.

FIG. 7C is a flowchart for explaining the processing sequence when the signal processing apparatus 700 according to this embodiment is implemented by software. However, the second to fourth and sixth to eighth embodiments can be implemented in the same manner by appropriately eliminating or adding differences in the respective block diagram.

According to this embodiment, with the above arrangement, it is possible to obtain a high quality output signal, as compared with the generalized side-lobe canceller. Therefore, it is possible to suppress a wideband signal and sufficiently enhance a target signal without increasing the array size or the number of sensors.

[Sixth Embodiment]

Figure 10:
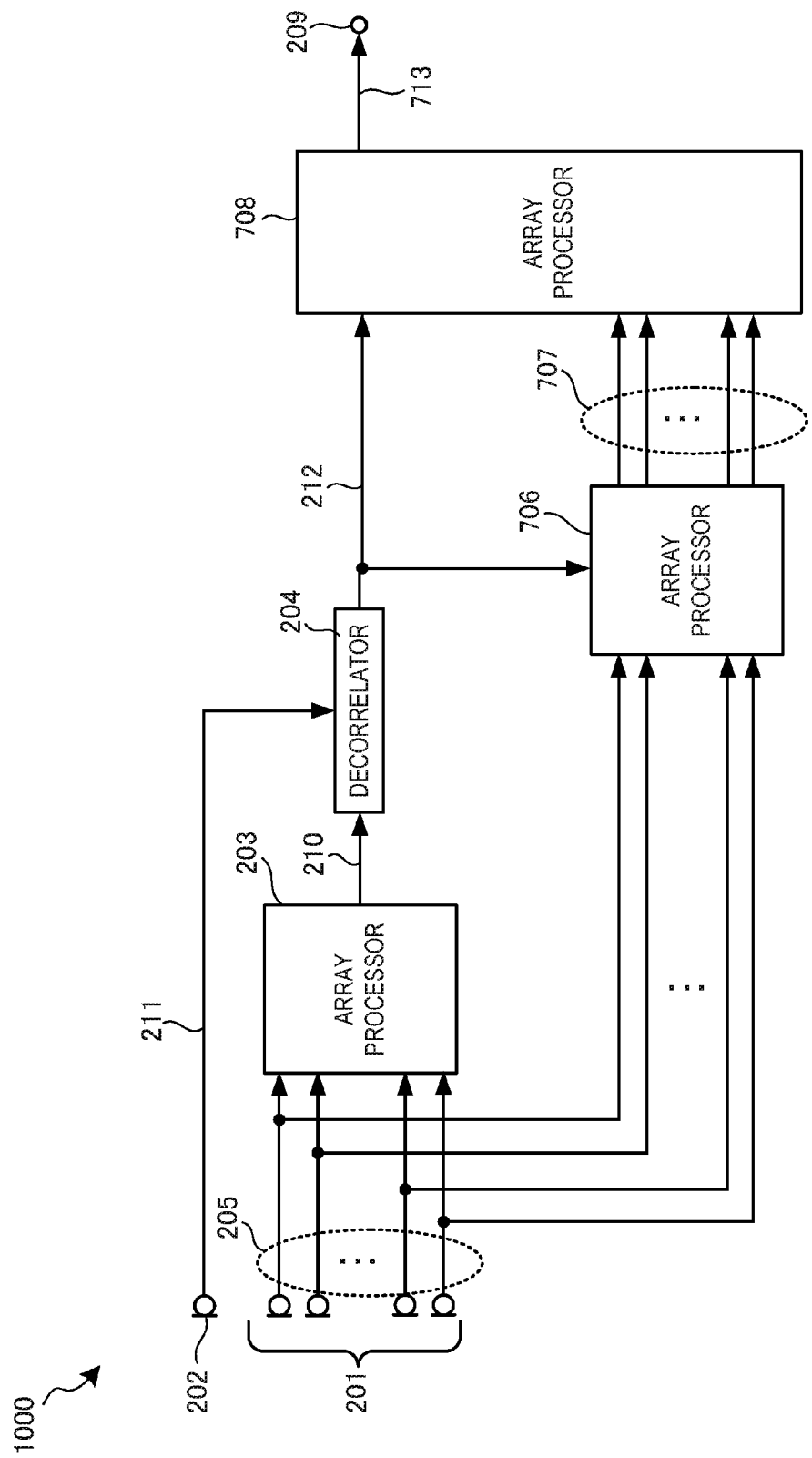
FIG. 10 is a block diagram showing the arrangement of a signal processing apparatus according to the sixth embodiment of the present invention.

A signal processing apparatus according to the sixth embodiment of the present invention will be described with reference to FIG. 10. FIG. 10 is a block diagram showing the arrangement of a signal processing apparatus 1000 according to this embodiment.

The signal processing apparatus 1000 according to this embodiment is different from the fifth embodiment in that a decorrelated signal 212 as an output of a decorrelator 204 is supplied to an array processor 708, instead of an array processing signal 210 as an output of an array processor 203. The remaining components and operations are the same as those in the third embodiment. Hence, the same reference numerals denote the same components and operations, and a detailed description thereof will be omitted.

As described above, according to this embodiment, the signal supplied to the array processor 708 is the decorrelated signal 212 having a higher interfering signal suppression effect, that is, a higher target signal enhancement effect than that of the array processing signal 210. Thus, a signal in which a target signal is further enhanced can be obtained as an output of the array processor 708. It is, therefore, possible to obtain a high quality output signal, as compared with the fifth embodiment. That is, it is possible to suppress a wideband signal and sufficiently enhance a target signal without increasing the array size or the number of sensors.

[Seventh Embodiment]

Figure 11:
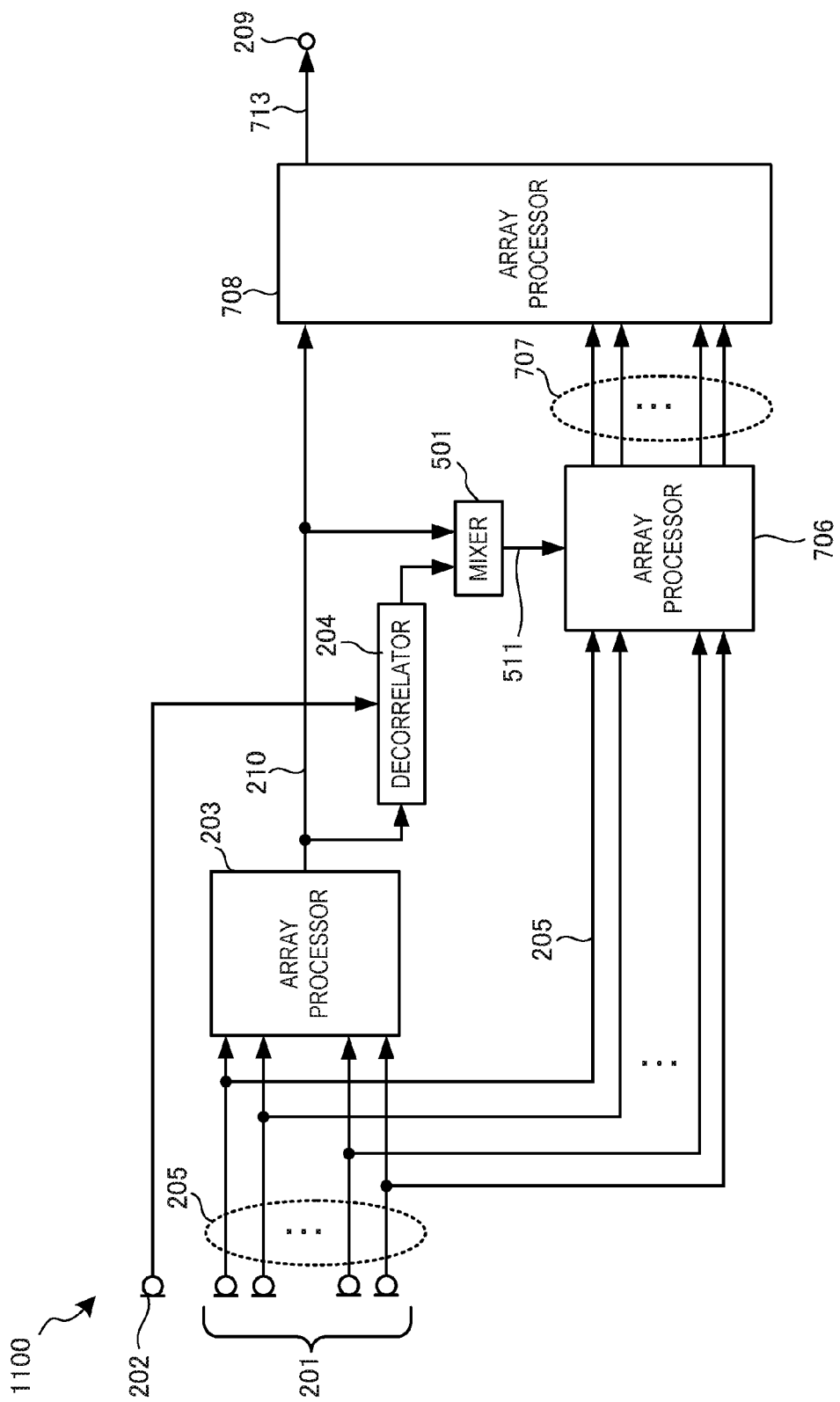
FIG. 11 is a block diagram showing the arrangement of a signal processing apparatus according to the seventh embodiment of the present invention.

A signal processing apparatus according to the seventh embodiment of the present invention will be described with reference to FIG. 11. FIG. 11 is a block diagram showing the arrangement of a signal processing apparatus 1100 according to this embodiment.

The signal processing apparatus 1100 according to this embodiment is different from the above fourth embodiment in that an array processors 706 and 708 are added. The remaining components and operations are the same as those in the second embodiment.

This embodiment is different from the above fifth embodiment in that a mixer 501 is added. The remaining components and operations are the same as those in the second embodiment.

Hence, except for the array processors 706 and 708 and the mixer 501, the same reference numerals denote the same components and operations, and a detailed description thereof will be omitted.

The arrangements and operations of the array processors 706 and 708 have already been described in the fifth embodiment and the arrangement and operation of the mixer 501 have already been described in the fourth embodiment. A detailed description thereof will be omitted.

As described above, according to this embodiment, it is possible to obtain a higher quality output than that in the fourth embodiment by adding the array processors 706 and 708, and obtain a higher quality output than that in the fifth embodiment by adding the mixer 501. That is, since a higher quality output than those in the fourth and fifth embodiment can be obtained, it is possible to suppress a wideband signal and sufficiently enhance a target signal without increasing the array size or the number of sensors.

[Eighth Embodiment]

Figure 12:
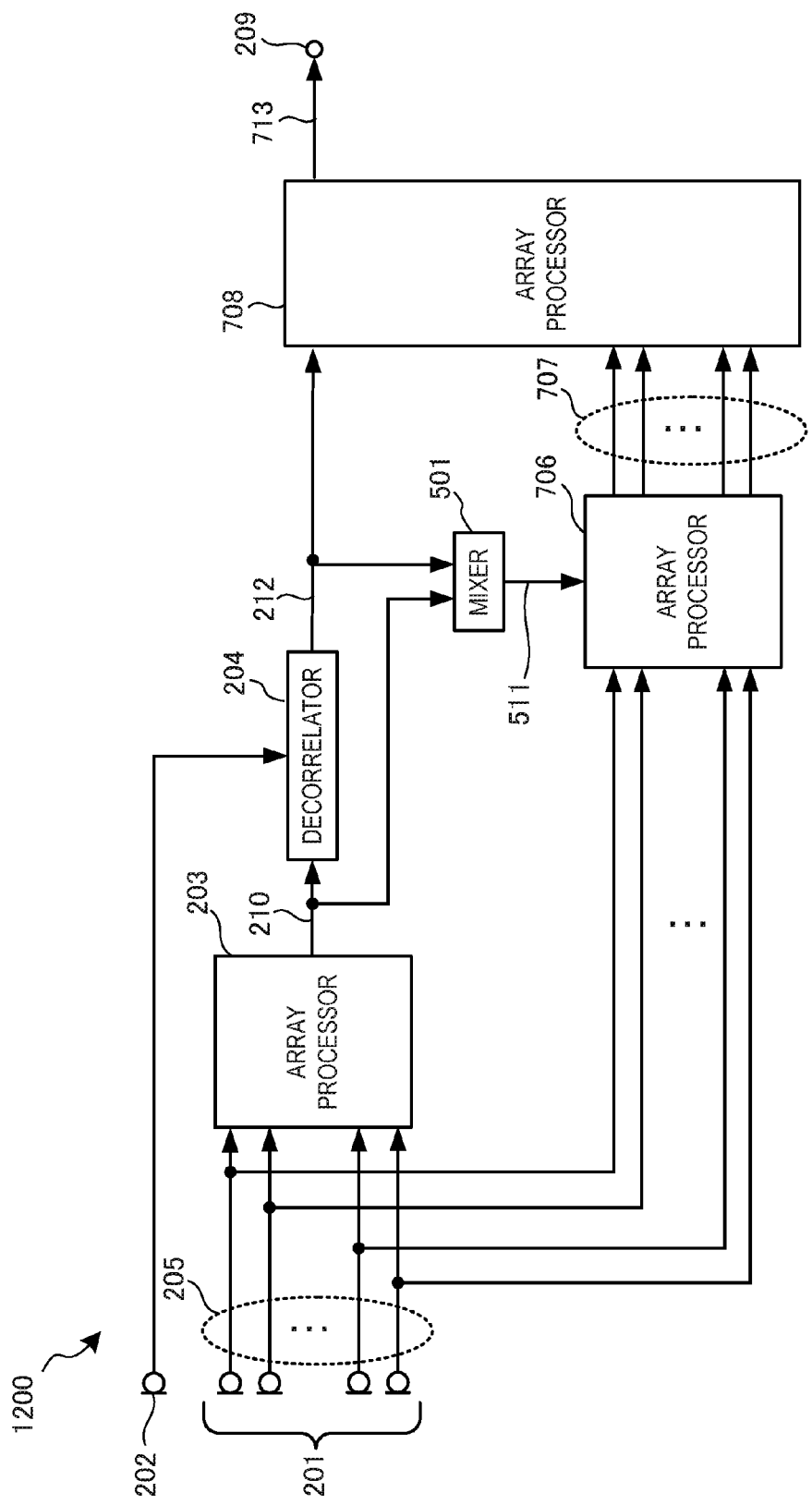
FIG. 12 is a block diagram showing the arrangement of a signal processing apparatus according to the eighth embodiment of the present invention.

A signal processing apparatus according to the eighth embodiment of the present invention will be described with reference to FIG. 12. FIG. 12 is a block diagram showing the functional arrangement of a signal processing apparatus 1200 according to this embodiment.

The signal processing apparatus 1200 according to this embodiment is different from the seventh embodiment in that a decorrelated signal 212 as an output of a decorrelator 204 is supplied to an array processor 708, instead of an array processing signal 210 as an output of an array processor 203.

The remaining components and operations are the same as those in the fifth embodiment. Hence, the same reference numerals denote the same components and operations, and a detailed description thereof will be omitted.

As described above, according to this embodiment, the signal supplied to the array processor 708 is the decorrelated signal 212 having a higher interfering signal suppression effect, that is, a higher target signal enhancement effect than that of the array processing signal 210. Thus, a signal in which a target signal is further enhanced can be obtained as an output of the array processor 708. It is, therefore, possible to obtain a high quality output signal, as compared with the seventh embodiment. That is, it is possible to suppress a wideband signal and sufficiently enhance a target signal without increasing the array size or the number of sensors.

[Ninth Embodiment]

Figure 13:
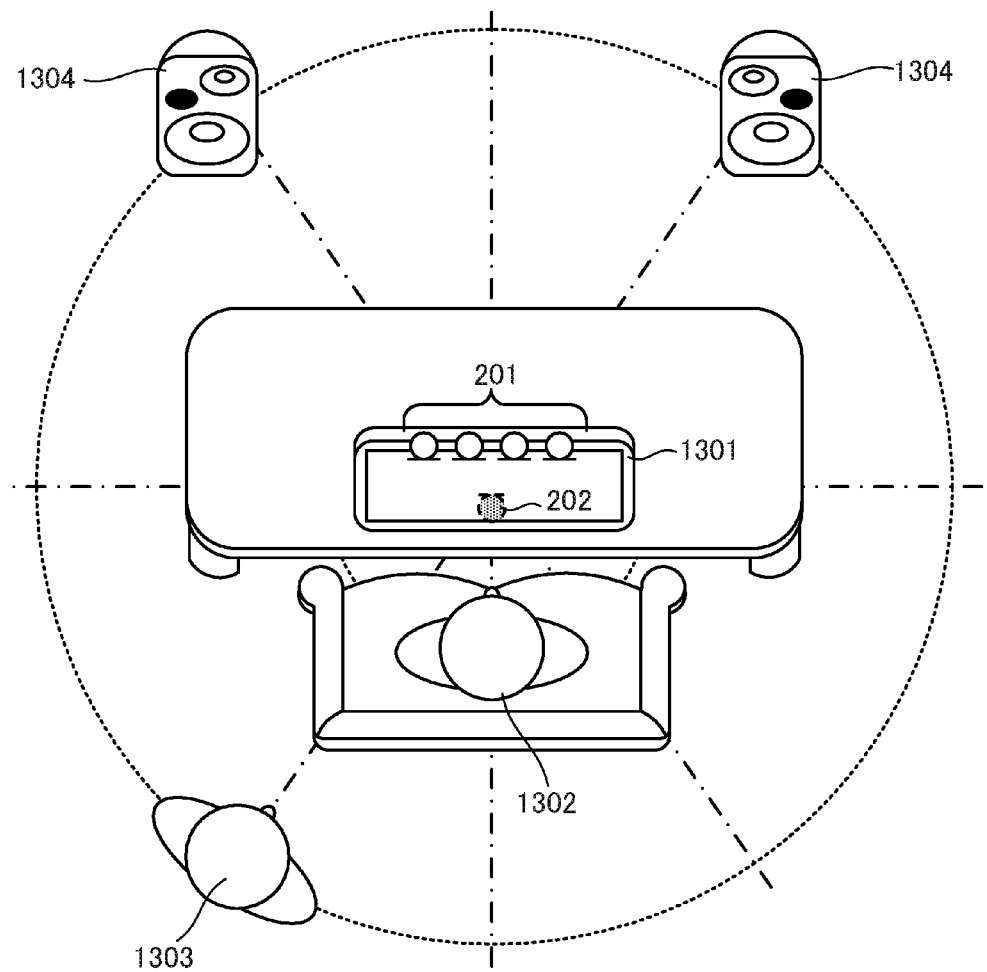
FIG. 13 is a block diagram showing the first application example of the first to eighth embodiments of the present invention.

As an application example of the present invention, a case in which a tablet PC placed on a desk is used to perform a video chat or remote communication via a network is considered. FIG. 13 is a top view of the application example.

A sensor array 201 including four sensors implemented by microphones is arranged on a top front surface of a tablet PC 1301, and a sensor 202 is arranged on a rear bottom surface of the tablet PC 1301. The surface may include inside the tablet PC which is close to the surface. The sensor 202 may be arranged on a top rear surface or on a side surface. By processing acoustic signals acquired by these microphones according to one of the first to eighth embodiments, it is possible to enhance the voice of a user 1302 sitting on a sofa, and suppress the voice of a person 1303 behind the user and music signals generated by front-right and front-left loudspeakers 1304 in front of the user. Consequently, only the speech of the user is obtained as an output, and the output is used for speech communication and/or speech recognition, thereby implementing comfortable speech communication and/or achieving a high speech recognition rate.

Furthermore, as shown in FIG. 14, a case is also considered in which a television receiver 1401 placed away from the user is used to perform video chat or remote communication via a network. FIG. 14 is a top view of the application example.

A sensor array 201 including four sensors implemented by microphones is arranged on a top front surface of the television receiver 1401, and a sensor 202 is arranged on a bottom rear surface of the television receiver 1401. The sensor 202 may be arranged on a top rear surface or on a side surface. By processing acoustic signals acquired by these microphones according to one of the first to eighth embodiments, it is possible to enhance the voice of a user 1402 sitting on a sofa, and suppress the voice of a person 1404 diagonally in front of the television receiver 1401 and music signals generated by right-side and left-side loudspeakers 1403 of the television receiver. Consequently, only the speech of the user 1402 is obtained as an output, and the output is used for speech communication and/or speech recognition, thereby implementing comfortable speech communication and/or achieving a high speech recognition rate. More specifically, by controlling the television receiver 1401 with commands obtained by speech recognition, the user 1402 can change the channel and volume of the television receiver 1401 using speech.

[Other Embodiments]

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is applicable to a system including a plurality of devices or a single apparatus. The present invention is also applicable even when a signal processing program for implementing the functions of the embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program.

[Other Expressions of Embodiments]

Some or all of the above-described embodiments can also be described as in the following supplementary notes but are not limited to the followings.

(Supplementary Note 1)

There is provided a signal processing apparatus comprising:

a first array processor that generates a first array processing signal by partially enhancing a predetermined signal among signals received from a plurality of sensors; and a decorrelator that generates a decorrelated signal by removing, from the first array processing signal, a signal component correlated with a signal received from an auxiliary sensor different from the plurality of sensors.

(Supplementary Note 2)

There is provided the signal processing apparatus according to supplementary note 1, further comprising:

a mixer that generates a mixed signal by mixing the decorrelated signal and the first array processing signal.

(Supplementary Note 3)

There is provided the signal processing apparatus according to supplementary note 2, wherein the mixer includes a low-pass filter that passes a low frequency component of the decorrelated signal, a high-pass filter that passes a high-pass component of the first array processing signal, and an adder that adds an output of the low-pass filter and an output of the high-pass filter.

(Supplementary Note 4)

There is provided the signal processing apparatus according to any one of supplementary notes 1 to 3, further comprising:

a second array processor that generates a second array processing signal by attenuating the predetermined signal based on the signals received from the plurality of sensors and the decorrelated signal; and a third array processor that removes a signal component correlated with the second array processing signal from the first array processing signal.

(Supplementary Note 5)

There is provided the signal processing apparatus according to any one of supplementary notes 1 to 3, further comprising:

a second array processor that generates a second array processing signal by attenuating the predetermined signal based on the signals received from the plurality of sensors and the decorrelated signal; and a third array processor that removes a signal component correlated with the second array processing signal from the decorrelated signal.

(Supplementary Note 6)

There is provided the signal processing apparatus according to any one of supplementary notes 1 to 5, wherein the decorrelator includes an adaptive filter that processes the signal received from the auxiliary sensor, and a subtractor that generates a decorrelated signal by subtracting an output of the adaptive filter from the first array processing signal, and the decorrelator updates coefficients of the adaptive filter using the signal received from the auxiliary sensor and an output of the subtractor.

(Supplementary Note 7)

There is provided a signal processing method comprising:

generating an array processing signal by partially enhancing a predetermined signal among signals received from a plurality of sensors; and generating a decorrelated signal by removing, from the array processing signal, a signal component correlated with a signal received from an auxiliary sensor different from the plurality of sensors.

(Supplementary Note 8)

There is provided a signal processing program for causing a computer to execute a method, comprising:

generating an array processing signal by partially enhancing a predetermined signal among signals received from a plurality of sensors; and generating a decorrelated signal by removing, from the array processing signal, a signal component correlated with a signal received from an auxiliary sensor different from the plurality of sensors.

(Supplementary Note 9)

There is provided a media processing apparatus comprising:

a plurality of sensors arranged on a front surface of the media processing apparatus;

an auxiliary sensor arranged at a position at which an acoustic characteristic is different from those of the plurality of sensors;

an array processor that generates an array processing signal by partially enhancing a predetermined signal among signals received from the plurality of sensors; and a decorrelator that generates a decorrelated signal by removing, from the array processing signal, a signal component correlated with a signal received from the auxiliary sensor.

This application claims the benefit of Japanese Patent Application No. 2013-209731, filed on Oct. 4, 2013, which is hereby incorporated by reference in its entirety.

The invention claimed is:

1. A signal processing apparatus comprising:
a first array processor that generates a first array processing signal by enhancing a predetermined signal among signals received from a plurality of sensors;
a decorrelator that generates a decorrelated signal by removing, from the first array processing signal, a signal component correlated with a signal received from an auxiliary sensor which is different from the plurality of sensors; and
a mixer that generates a mixed signal by mixing the decorrelated signal and the first array processing signal.

2. The signal processing apparatus according to claim 1, wherein said mixer includes:
a low-pass filter that passes low frequency components of the decorrelated signal,
a high-pass filter that passes high-frequency components of the first array processing signal, and
an adder that adds an output of said low-pass filter and an output of said high-pass filter.

3. A signal processing apparatus comprising:
a first array processor that generates a first array processing signal by enhancing a predetermined signal among signals received from a plurality of sensors;
a decorrelator that generates a decorrelated signal by removing, from the first array processing signal, a signal component correlated with a signal received from an auxiliary sensor which is different from the plurality of sensors;
a second array processor that generates a second array processing signal by attenuating the predetermined signal, based on the signals received from the plurality of sensors and the decorrelated signal; and
a third array processor that removes a signal component correlated with the second array processing signal from the first array processing signal.

4. A signal processing apparatus comprising:
a first array processor that generates a first array processing signal by enhancing a predetermined signal among signals received from a plurality of sensors;
a decorrelator that generates a decorrelated signal by removing, from the first array processing signal, a signal component correlated with a signal received from an auxiliary sensor which is different from the plurality of sensors;
a second array processor that generates a second array processing signal by attenuating the predetermined signal, based on the signals received from the plurality of sensors and the decorrelated signal; and
a third array processor that removes a signal component correlated with the second array processing signal from the decorrelated signal.

5. The signal processing apparatus according to claim 4, wherein said decorrelator includes an adaptive filter that processes the signal received from the auxiliary sensor, and a subtractor that generates a decorrelated signal by subtracting an output of said adaptive filter from the first array processing signal, and said decorrelator updates coefficients of said adaptive filter using the signal received from the auxiliary sensor and an output of said subtractor.

* * * * *